United States Patent
Pech et al.

(10) Patent No.: US 10,309,317 B2
(45) Date of Patent: Jun. 4, 2019

(54) AIR TURBINE STARTER PRESSURE MONITOR SYSTEM

(71) Applicant: United Technologies Corporation, Hartford, CT (US)

(72) Inventors: John T. Pech, Canton, CT (US); W. Dean Kavalkovich, Cobalt, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1147 days.

(21) Appl. No.: 14/306,870

(22) Filed: Jun. 17, 2014

(65) Prior Publication Data
US 2014/0373554 A1 Dec. 25, 2014

Related U.S. Application Data

(60) Provisional application No. 61/837,893, filed on Jun. 21, 2013.

(51) Int. Cl.
*F02C 7/277* (2006.01)
*F02C 7/268* (2006.01)

(52) U.S. Cl.
CPC .............. *F02C 7/277* (2013.01); *F02C 7/268* (2013.01); *F05D 2260/80* (2013.01); *F05D 2260/81* (2013.01); *F05D 2260/85* (2013.01); *F05D 2270/00* (2013.01); *F05D 2270/301* (2013.01); *F05D 2270/304* (2013.01)

(58) Field of Classification Search
CPC .. F02C 7/26; F02C 7/262; F02C 7/264; F02C 7/266; F02C 7/268; F02C 7/27; F02C 7/272; F02C 7/275; F02C 7/277; F05D 2260/80; F05D 2260/81; F05D 2260/82; F05D 2260/821; F05D 2260/85
See application file for complete search history.

(56) References Cited

U.S. PATENT DOCUMENTS

| | | | | | |
|---|---|---|---|---|---|
| 3,059,660 | A | * | 10/1962 | Dantowitz | F01D 17/26 137/488 |
| 4,220,439 | A | * | 9/1980 | Burch | F01D 19/02 137/72 |
| 4,606,189 | A | * | 8/1986 | Charrier | F02C 7/26 60/39.281 |
| 4,805,873 | A | * | 2/1989 | Mouton | F02C 7/277 251/30.05 |

(Continued)

OTHER PUBLICATIONS

A. Ausloos & J.R. Masse, E. Grall-Maës, P. Beauseroy & A. Grall, Estimation of monitoring indicators using regression methods application to turbofan start sequence, 2010 Taylor & Francis Group, London, UK, pp. 193-200.*

(Continued)

*Primary Examiner* — Gerald L Sung
*Assistant Examiner* — Marc J Amar
(74) *Attorney, Agent, or Firm* — O'Shea Getz P.C.

(57) ABSTRACT

A method of monitoring a gas turbine engine start system includes monitoring a pressure in a starter air duct in communication with a starter air valve which is in communication with an air turbine starter (ATS); identifying an expected transient pressure response in the starter air duct; and identifying the starter air valve as degraded if the expected transient pressure response does not occur after an open command to the starter air valve.

13 Claims, 7 Drawing Sheets

(56) References Cited

U.S. PATENT DOCUMENTS

| | | | | |
|---|---|---|---|---|
| 4,960,085 A * | 10/1990 | Coons | ............... | F02N 7/08 |
| | | | | 123/179.31 |
| 5,054,284 A | 10/1991 | Shekleton | | |
| 5,245,820 A | 9/1993 | Zalewski et al. | | |
| 5,267,433 A | 12/1993 | Burch | | |
| 5,319,989 A * | 6/1994 | Burch | ............... | F02N 7/12 |
| | | | | 123/179.31 |
| 5,435,125 A * | 7/1995 | Telakowski | ............. | F02C 7/277 |
| | | | | 60/625 |
| 5,463,865 A * | 11/1995 | Smith | ............... | F02C 7/277 |
| | | | | 415/118 |
| 5,531,066 A * | 7/1996 | Pfefferle | ............... | F23Q 11/04 |
| | | | | 431/268 |
| 5,748,500 A * | 5/1998 | Quentin | ............. | G07C 3/00 |
| | | | | 702/182 |
| 6,057,771 A * | 5/2000 | Lakra | ............... | G01M 3/2876 |
| | | | | 137/551 |
| 6,318,958 B1 | 11/2001 | Giesler et al. | | |
| 6,456,928 B1 * | 9/2002 | Johnson | ............... | F02B 77/08 |
| | | | | 701/111 |
| 6,470,258 B1 * | 10/2002 | Leamy | ............... | F02C 7/26 |
| | | | | 701/100 |
| 6,498,978 B2 * | 12/2002 | Leamy | ............... | F02C 9/28 |
| | | | | 701/100 |
| 6,623,238 B2 | 9/2003 | Langston et al. | | |
| 6,681,579 B2 * | 1/2004 | Lane | ............... | F01D 25/18 |
| | | | | 60/39.091 |
| 6,684,898 B2 | 2/2004 | Wiggins et al. | | |
| 6,694,746 B2 * | 2/2004 | Reed | ............... | F02C 7/047 |
| | | | | 137/488 |
| 6,868,325 B2 * | 3/2005 | Menon | ............... | F02C 9/00 |
| | | | | 701/100 |
| 6,969,235 B2 | 11/2005 | Feest | | |
| 6,991,425 B2 | 1/2006 | Kruegel et al. | | |
| 7,033,133 B2 | 4/2006 | Bristol et al. | | |
| 7,033,134 B2 | 4/2006 | Bristol et al. | | |
| 7,066,710 B2 | 6/2006 | Wiggins et al. | | |
| 7,147,430 B2 * | 12/2006 | Wiggins | ............... | F01D 17/145 |
| | | | | 137/488 |
| 7,186,081 B2 | 3/2007 | Giesler et al. | | |
| 7,251,550 B2 * | 7/2007 | Eschborn | ............. | G05B 23/0254 |
| | | | | 340/945 |
| 7,369,932 B2 * | 5/2008 | Kim | ............... | F01D 21/00 |
| | | | | 477/30 |
| 8,020,585 B2 * | 9/2011 | Shock | ............... | F17D 5/02 |
| | | | | 137/554 |
| 8,370,045 B2 * | 2/2013 | Qiu | ............... | F01D 19/00 |
| | | | | 415/13 |
| 8,825,278 B2 * | 9/2014 | Bense | ............... | F16K 37/0083 |
| | | | | 701/32.9 |
| 10,094,292 B2 * | 10/2018 | Ainslie | ............... | F02C 7/26 |
| 2003/0145603 A1 * | 8/2003 | Reed | ............... | F02C 7/047 |
| | | | | 60/787 |
| 2010/0043896 A1 * | 2/2010 | Shock | ............... | F17D 5/02 |
| | | | | 137/613 |
| 2012/0017602 A1 * | 1/2012 | Hansen | ............... | F01D 19/00 |
| | | | | 60/778 |
| 2013/0227959 A1 * | 9/2013 | Ainslie | ............... | F02C 7/26 |
| | | | | 60/778 |

OTHER PUBLICATIONS

US Department of Transportation, FAA, The Aviation Maintenance Technician Handbook—Powerplant (FAA-H-8083-32), pp. 5-8 to 5-17. URL: https://www.faa.gov/regulations_policies/handbooks_manuals/aircraft/media/FAA-H-8083-32-AMT-Powerplant-Vol-1.pdf.*

* cited by examiner

AIR TURBINE STARTER PRESSURE MONITOR SYSTEM

CROSS-REFERENCE TO RELATED APPLICATION

This application claims priority to U.S. Patent Application Ser. No. 61/837,893 filed Jun. 21, 2013, which is hereby incorporated herein by reference in its entirety.

BACKGROUND

The present disclosure relates to an air turbine starter which is operable to start a gas turbine engine, and more particularly to a monitor system therefore.

Many relatively large gas turbine engines such as turbofans, utilize an air turbine starter (ATS) for spool up to ignition. The ATS is typically mounted to an accessory gearbox to drive a high spool of the gas turbine engine. The ATS generally includes an air turbine section coupled to an output section. The air turbine section is coupled to a high-pressure air source, such as compressed air from an auxiliary power unit (APU), to drive the output section through a gear system. Thus, when the high-pressure air impinges upon the air turbine section, the output section spools-up the gas turbine engine through the accessory gearbox.

Should the gas turbine engine fail to start at the beginning of each flight cycle, it may be difficult to isolate the failed component which may result in a no-fault-found rate that may not be acceptable to commercial airlines.

SUMMARY

A method of monitoring a gas turbine engine start system is provided according to one disclosed non-limiting embodiment of the present disclosure. This method includes: monitoring a pressure in a starter air duct in communication with a starter air valve which is in communication with an Air Turbine Starter (ATS); identifying an expected transient pressure response in the starter air duct; and identifying the starter air valve as degraded if the expected transient pressure response does not occur after an open command to the starter air valve.

In a further embodiment of the present disclosure, the method may include: monitoring a rotational speed of the Air Turbine Starter (ATS); and identifying the Air Turbine Starter (ATS) as degraded if the rotational speed of the Air Turbine Starter (ATS) does not increase after the open command.

In a further embodiment of any of the foregoing embodiments of the present disclosure, the method may include: monitoring a rotational speed (N2) of a gas turbine engine selectively driven by the Air Turbine Starter (ATS); and identifying a starter shaft of the Air Turbine Starter (ATS) as degraded if the rotational speed (N2) of the gas turbine engine does not increase after the open command.

In a further embodiment of any of the foregoing embodiments of the present disclosure, the method may include: monitoring a rotational speed of the Air Turbine Starter (ATS); monitoring a rotational speed (N2) of a gas turbine engine selectively driven by the Air Turbine Starter (ATS); identifying the Air Turbine Starter (ATS) as degraded if the rotational speed of the Air Turbine Starter (ATS) does not increase after the open command; and identifying a starter shaft of the Air Turbine Starter (ATS) as degraded if the rotational speed (N2) of the gas turbine engine does not increase after the open command.

In a further embodiment of any of the foregoing embodiments of the present disclosure, the method may include sending pressurized air from an auxiliary power unit to the Air Turbine Starter (ATS) through the starter air duct and the starter air valve.

In a further embodiment of any of the foregoing embodiments of the present disclosure, the method may include sending pressurized air from a gas turbine engine to the Air Turbine Starter (ATS) through the starter air duct and the starter air valve.

A gas turbine engine start system is provided according to another disclosed non-limiting embodiment of the present disclosure. This gas turbine engine start system includes an Air Turbine Starter (ATS) in communication with a starter air duct. The gas turbine engine start system also includes a controller and a starter air valve in communication with the starter air duct. The controller is in communication with the starter air duct. The controller is operable to monitor a pressure in the starter air duct and identify an expected transient pressure response in the starter air duct to thereby identify that the starter air valve is degraded if the expected transient pressure response does not occur after an open command to the starter air valve.

In a further embodiment of any of the foregoing embodiments of the present disclosure, the controller may be operable to identify a degraded Air Turbine Starter (ATS).

In a further embodiment of any of the foregoing embodiments of the present disclosure, the controller may be operable to identify a degraded shaft of the Air Turbine Starter (ATS).

In a further embodiment of any of the foregoing embodiments of the present disclosure, a pressure sensor may be included within the starter air duct. The pressure sensor may be in communication with the controller to monitor the pressure in the starter air duct and identify the expected transient pressure response.

A method of monitoring a gas turbine engine start system is provided according to another disclosed non-limiting embodiment of the present disclosure. This method includes: monitoring a pressure drop within a starter air duct upstream of a starter air valve in communication with an air turbine starter (ATS); and identifying the starter air valve as degraded if the pressure drop is less than a predetermined pressure drop.

In a further embodiment of any of the foregoing embodiments of the present disclosure, the identifying may include measuring a pressure within the starter air duct upstream of the starter air valve to determine an immediate pressure response profile in response to an open command to the starter air valve.

In a further embodiment of any of the foregoing embodiments of the present disclosure, the identifying may include measuring a pressure within the starter air duct upstream of the starter air valve to determine an immediate pressure response profile is within a tolerance band in response to an open command to the starter air valve.

In a further embodiment of any of the foregoing embodiments of the present disclosure, the tolerance band may be determined from a multiple of engine starts.

In a further embodiment of any of the foregoing embodiments of the present disclosure, the tolerance band may be predetermined.

In a further embodiment of any of the foregoing embodiments of the present disclosure, the method may include: monitoring a rotational speed of the ATS; identifying the starter air valve as degraded if the pressure drop is less than a predetermined pressure drop; and identifying the ATS as degraded if the rotational speed of the ATS does not increase in response to an open command to the starter air valve and the pressure drop is within said predetermined pressure drop.

In a further embodiment of any of the foregoing embodiments of the present disclosure, the method may include: monitoring a rotational speed (N2) of a gas turbine engine selectively driven by the ATS; and identifying a starter shaft of the ATS as degraded if the N2 of the gas turbine engine does not increase in response to an open command to the starter air valve, if the rotational speed of the ATS does not increase in response to the open command to the starter air valve and if the pressure drop is less than the predetermined pressure drop.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
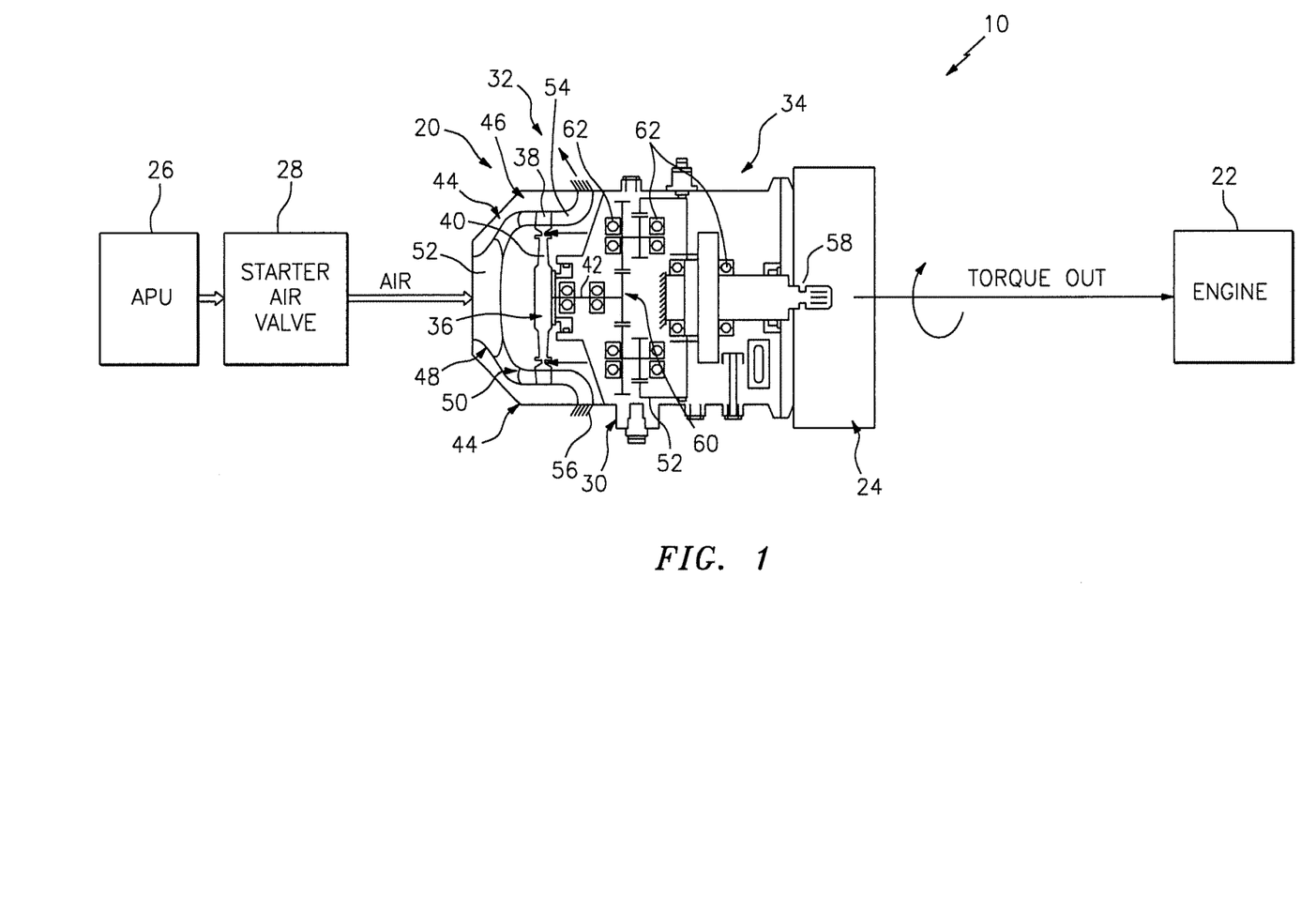
FIG. 1 is a general schematic view of a starter system with an air turbine starter (ATS) used to initiate the rotation of a larger gas turbine engine.

FIG. 1 schematically illustrates a gas turbine engine start system 10 with an Air Turbine Starter (ATS) 20 operable to initiate spool-up of a larger gas turbine engine 22 through an accessory gearbox 24. The ATS 20 is powered by high pressure air from, for example, an auxiliary power unit (APU) 26 that is selectively communicated through a starter air valve 28. It should be appreciated that the high pressure air may be alternatively or additionally sourced from a second propulsion gas turbine engine typical of a multi-engine aircraft.

The ATS 20 generally includes a housing assembly 30 with a turbine section 32 and an output section 34. The turbine section 32 includes a turbine wheel 36 with a plurality of turbine blades 38, a hub 40, and a turbine rotor shaft 42. The turbine blades 38 of the turbine wheel 36 are located downstream of an inlet housing assembly 44 with an inlet assembly 46 and a nozzle assembly 48. The nozzle assembly 48 includes a plurality of vanes 50 to direct the compressed airflow from an inlet 52 to drive the turbine wheel 36. The air is then exhausted through a flowpath 54 and exhaust baffles 56.

The turbine wheel 36 is driven by the high pressure air such that the turbine rotor shaft 42 mechanically drives a starter output shaft 58 though a gear system 60 such as a planetary gear system. The turbine rotor shaft 42, the starter output shaft 58 and the gear system 60 are typically supported upon bearings 62. The ATS 20 thereby transmits relatively high loads through the gear system 60 to convert the pneumatic energy from the high pressure air into mechanical energy to, for example, rotate the gas turbine 22 for spool-up.

Figure 2:
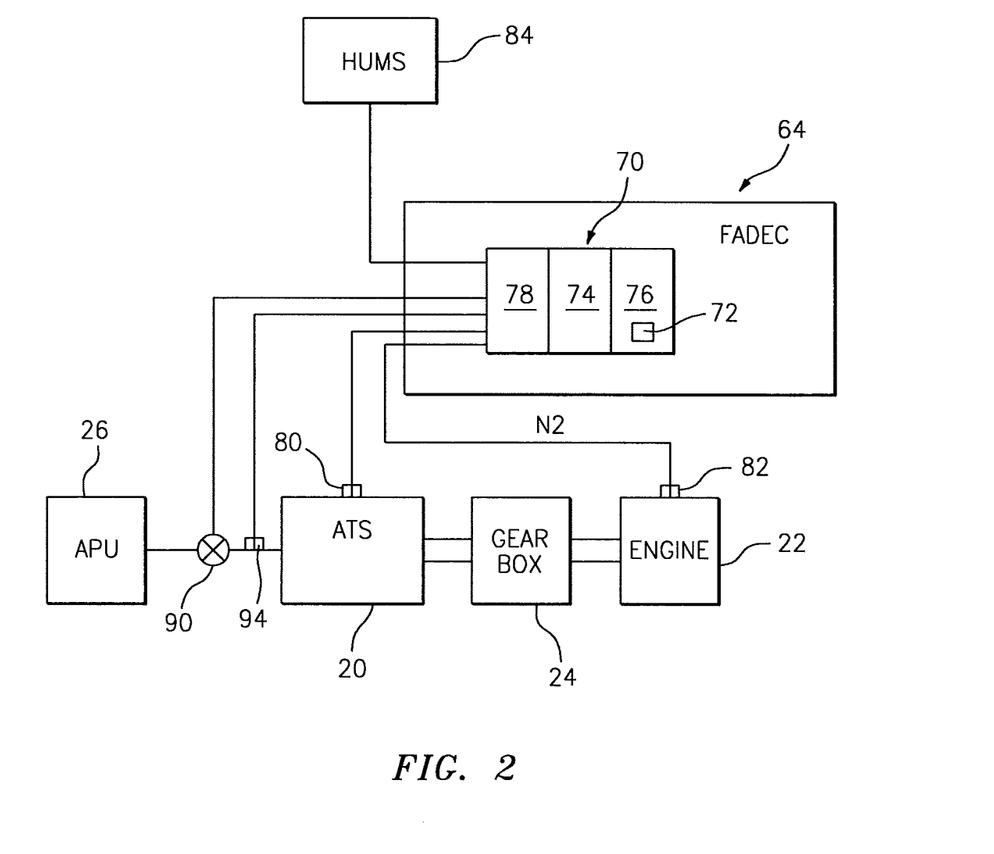
FIG. 2 is a schematic block diagram of a control system for the air turbine starter (ATS), according to an embodiment.

With reference to FIG. 2, an electronic engine control (EEC) 64 (illustrated schematically) is in electrical communication with the ATS 20. In one non-limiting embodiment, the EEC 64 may be a portion of a flight control computer, a portion of a Full Authority Digital Engine Control (FADEC), a stand-alone unit or other system that may additionally control normal operations of the ATS 20.

The EEC 64 generally includes a control module 70 that executes monitoring logic 72. The control module 70 may include a processor 74, a memory 76, and an interface 78. The processor 74 may include any type of known microprocessor having desired performance characteristics. The memory 76 may include any computer readable medium which stores data and control algorithms such as the monitoring logic 72 as described herein. The interface 78 facilitates communication with other components such as a speed sensor 80 that measures a speed of the turbine rotor shaft 42, a speed sensor 82 that measures a shaft speed of the gas turbine engine 22, e.g., N2 as well as other on-board and off-board systems such as a Health and Usage Monitoring System (HUMS) 84. The components and functions described herein are provided for illustrative purposes, it will be understood that in alternate embodiments all of the components may be in separate components, or on a single component such as a system on a chip (SOC).

Figure 3:
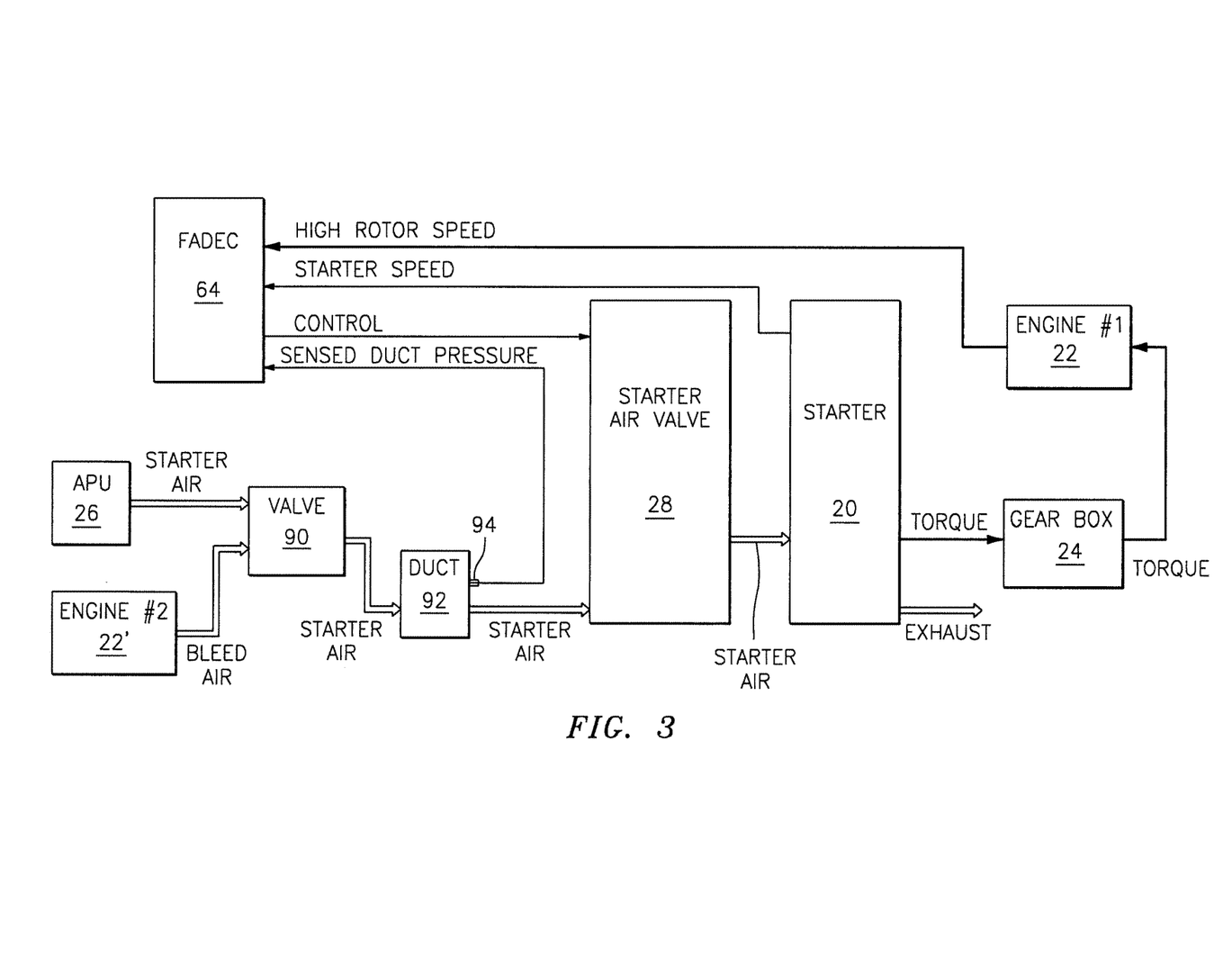
FIG. 3 is a block diagram of monitoring logic in the control system of the air turbine starter (ATS), according to an embodiment.

With reference to FIG. 3, the starter air valve 28 is downstream of a cross bleed valve 90 which selectively communicates high pressure air from either the APU 26 or another propulsion gas turbine engine 22' in, for example, a multi-engine aircraft. The cross bleed valve 90 communicates the selected high pressure air source to the Starter air valve 28 through a starter air duct 92.

Figure 4:
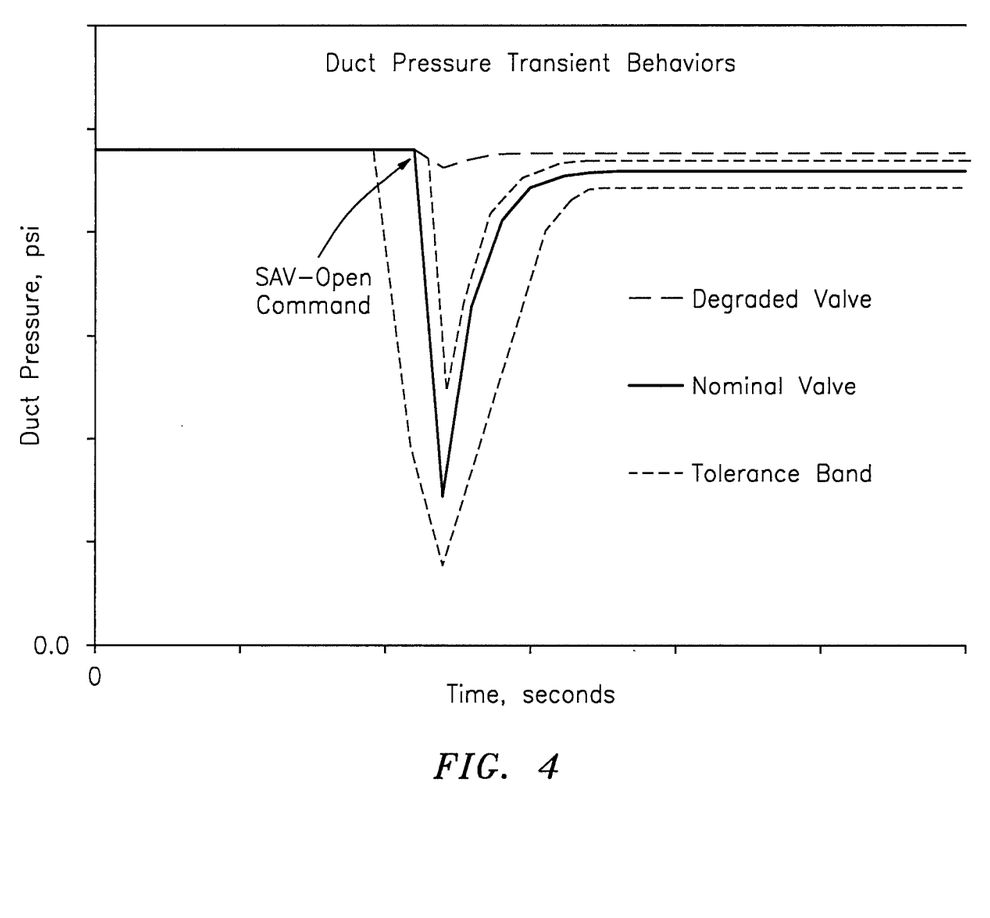
FIG. 4 is a graphical representation of duct pressure transient behavior as monitored by the monitoring logic, according to an embodiment.

A starter duct pressure sensor 94 in communication with the control module 70 (see FIG. 2) is located within the starter air duct 92. The starter duct pressure sensor 94 is operable to detect the transient pressure response (illustrated graphically in FIG. 4) within the starter air duct 92 in response to actuation of the starter air valve 28.

Figure 5:
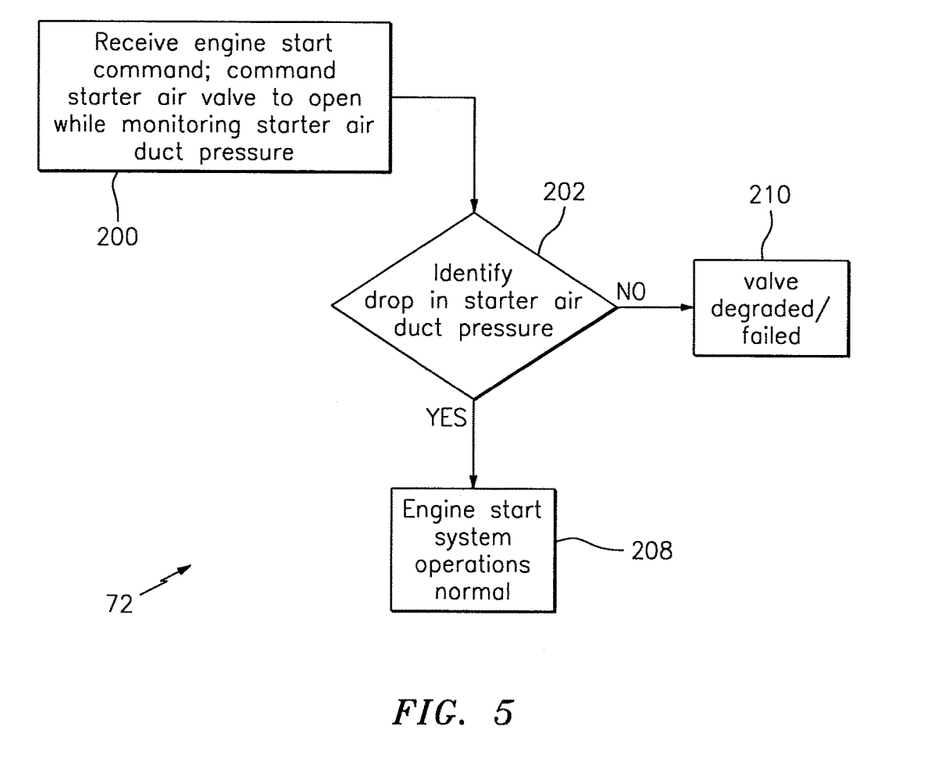
FIG. 5 is a schematic functional block diagram of monitoring logic operations, according to one embodiment.

With reference to FIG. 5, the monitoring logic 72 operates to facilitate isolation of issues with the ATS 20 and/or to the starter air valve 28 in response to the presence of an expected transient pressure response in the starter air duct 92. The monitoring logic 72 is disclosed in terms of functional block diagrams, and it should be understood by those skilled in the art with the benefit of this disclosure that these functions may be enacted in either dedicated hardware circuitry or programmed software routines capable of execution in a microprocessor based electronic control embodiment.

Referring to FIGS. 1-3 and 5, in one non-limiting embodiment, the EEC 64 receives an engine start command from the aircraft cockpit then commands the starter air valve 28 to open while monitoring the pressure within the starter air duct 92 via the starter duct pressure sensor 94 (block 200). The EEC 64 then monitors operating pressure within the starter air duct 92 to identify the drop in pressure (block 202; illustrated graphically as a pressure reduction in FIG. 4). That is, the monitoring logic 72 compares a nominal pressure response profile to the immediate pressure response profile within the starter air duct 92 in response to an open command to the starter air valve 28 so as to identify a potential degraded pressure profile (illustrated graphically in FIG. 4). As defined herein, the immediate pressure response profile is the most recent engine start operation, however multiple profiles may be stored in memory 76 from multiple engine starts (see FIG. 2). That is, multiple stored immediate pressure response profiles from multiple engine starts may be utilized to define a tolerance band for the nominal pressure response profile to minimize false indications or alternatively, the tolerance band may be predefined from known variances through testing and/or simulation.

If the starter duct pressure sensor 94 observes the degraded pressure profile outside of the tolerance band which is of less than a predetermined decrease in pressure with respect to the nominal pressure response profile within the starter air duct 92, the monitoring logic 72 identifies that the starter air valve 28 as degraded and/or failed. That is, if the upstream pressure is sufficient for start, but the pressure within the starter air duct 92 does not dip to the nominal pressure response profile when the starter air valve 28 is commanded to open with a tolerance, the starter air valve 28 may be identified by the monitoring logic 72 as non-functional (block 210). If no starter air valve 28 degradation is identified, the starter system 10 is operational (block 208).

Figure 6:
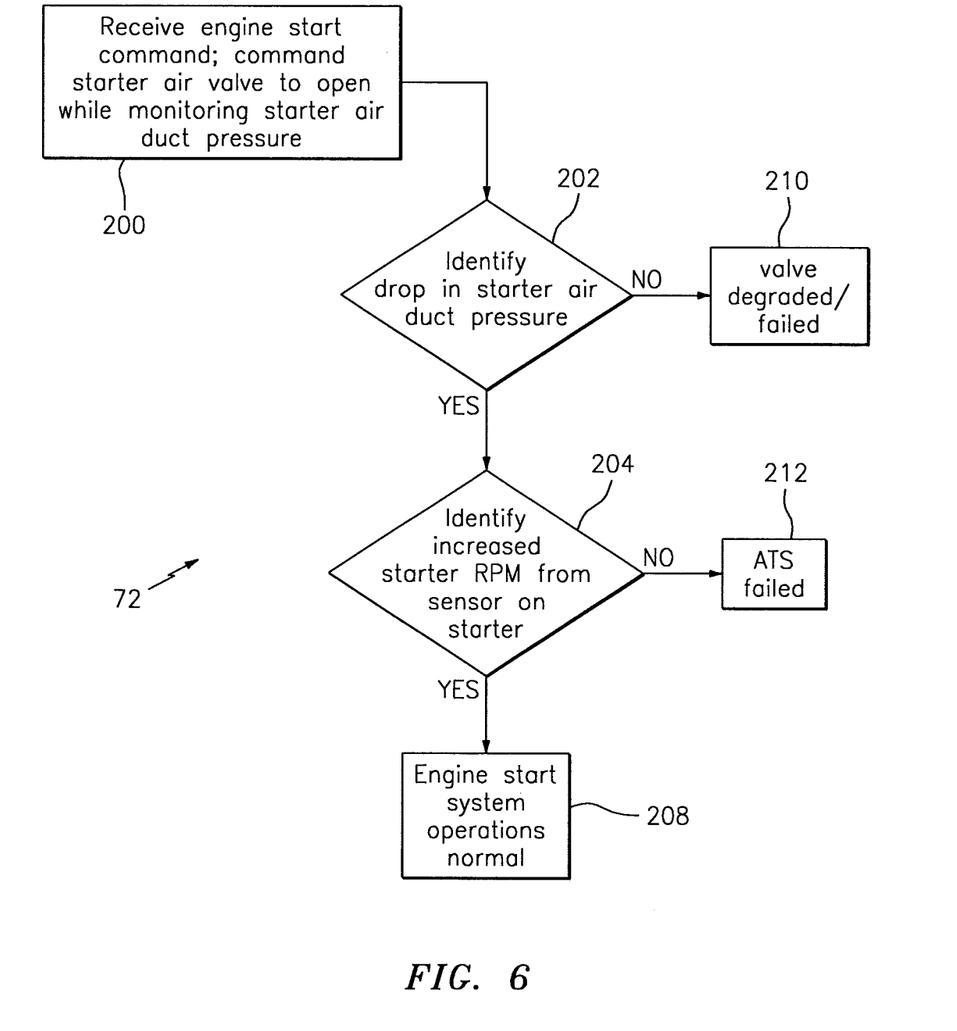
FIG. 6 is a schematic functional block diagram of monitoring logic operations, according to another embodiment.

With reference to FIG. 6, the EEC 64 may additionally monitor rotational speed of the ATS 20 with, for example, the speed sensor 80 (see FIG. 2) in communication the starter output shaft 58 (block 204). If an increase in starter RPM is not identified, the ATS 20 may be identified by the monitoring logic 72 as non-functional (block 212). That is, if the pressure drop is observed but the ATS 20 speed shows no increase, the ATS 20 is non-functional. If none of the above are identified, the starter system 10 is operational (block 208). If no starter air valve 28 or ATS 20 degradation is identified, the starter system 10 is operational (block 208).

Figure 7:
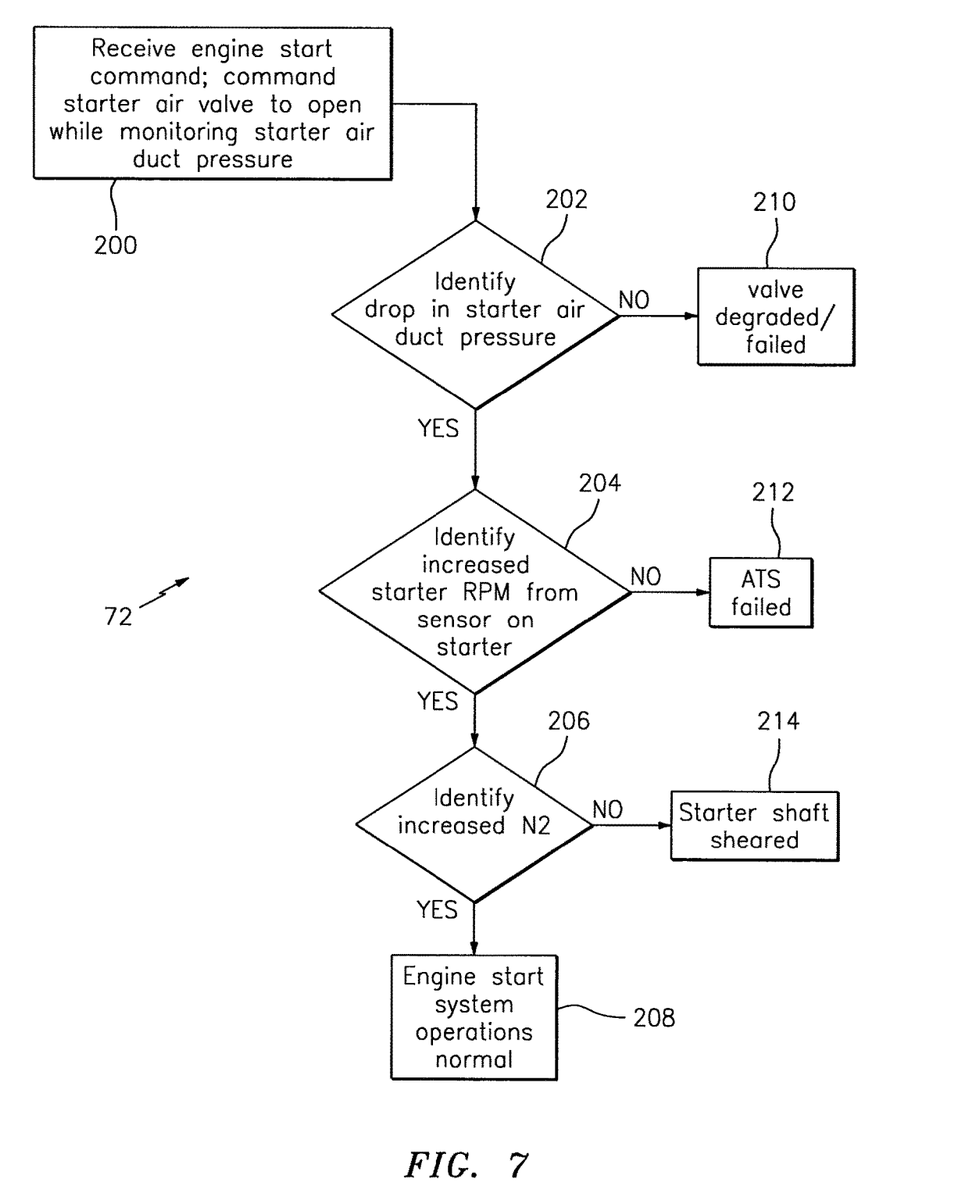
FIG. 7 is a schematic functional block diagram of monitoring logic operations, according to another embodiment.

With reference to FIG. 7, the EEC 64 may additionally monitor rotational speed ((N2) ) of the gas turbine engine 22 with, for example, the speed sensor 82 (see FIG. 2) in communication with, for example, a high speed spool (block 206). If an increase in N2 s not identified, the starter output shaft 58 may be identified by the monitoring logic 72 as sheared (block 214). That is, if the pressure drops and the starter speed increases normally, but the rotational speed ((N2) ) of the gas turbine engine 22 does not increase, a sheared starter output shaft 58 is the likely cause (block 214). If no starter air valve 28, ATS 20 or starter output shaft 58 degradation is identified, the starter system 10 is operational (block 208).

The monitoring logic 72 thereby reduces the no-fault-found rate for the ATS 20 and the starter air valve 28 under aircraft maintenance operations. The no-fault-found rate reduction is achieved by specific component fault isolation.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A method of monitoring a gas turbine engine start system, the method comprising:
   monitoring a pressure of air in a starter air duct that is upstream of and in communication with a starter air valve which is in communication with an Air Turbine Starter (ATS), wherein the air in the starter air duct is pressurized;
   identifying an expected transient pressure response of the pressure of the air in the starter air duct upstream of the starter air valve; and
   identifying the starter air valve as degraded if the expected transient pressure response of the air upstream of the starter air valve does not occur after an open command to the starter air valve by comparing the transient response to a stored nominal response.

2. The method as recited in claim 1, further comprising:
   monitoring a rotational speed of the Air Turbine Starter (ATS); and
   identifying the Air Turbine Starter (ATS) as degraded if the rotational speed of the Air Turbine Starter (ATS) does not increase after the open command.

3. The method as recited in claim 1, further comprising:
   monitoring a rotational speed of a gas turbine engine selectively driven by the Air Turbine Starter (ATS); and
   identifying a starter shaft of the Air Turbine Starter (ATS) as degraded if the rotational speed of the gas turbine engine does not increase after the open command.

4. The method as recited in claim 1, further comprising:
monitoring a rotational speed of the Air Turbine Starter (ATS);
monitoring a rotational speed of a gas turbine engine selectively driven by the Air Turbine Starter (ATS);
identifying the Air Turbine Starter (ATS) as degraded if the rotational speed of the Air Turbine Starter (ATS) does not increase after the open command; and
identifying a starter shaft of the Air Turbine Starter (ATS) as degraded if the rotational speed of the gas turbine engine does not increase after the open command.

5. The method as recited in claim 1, further comprising sending the pressurized air from an auxiliary power unit to the Air Turbine Starter (ATS) through the starter air duct and the starter air valve.

6. The method as recited in claim 1, further comprising sending the pressurized air from a gas turbine engine to the Air Turbine Starter (ATS) through the starter air duct and the starter air valve.

7. A method of monitoring a gas turbine engine start system, the method comprising:
monitoring a pressure drop within a starter air duct upstream of a starter air valve in communication with an Air Turbine Starter (ATS), wherein air in the starter air duct is pressurized before the monitoring; and
identifying the starter air valve as degraded if the monitored pressure drop upstream of the starter air valve within the starter air duct is less than a stored predetermined pressure drop after an open command is provided to the starter air valve.

8. The method as recited in claim 7, wherein the identifying further comprises measuring a pressure within the starter air duct upstream of the starter air valve to determine an immediate pressure response profile in response to the open command to the starter air valve.

9. The method as recited in claim 7, wherein the identifying further comprises measuring a pressure within the starter air duct upstream of the starter air valve to determine an immediate pressure response profile is within a tolerance band in response to the open command to the starter air valve.

10. The method as recited in claim 9, wherein said tolerance band is determined from a multiple of engine starts.

11. The method as recited in claim 9, wherein said tolerance band is predetermined.

12. The method as recited in claim 7, further comprising:
monitoring a rotational speed of the Air Turbine Starter (ATS); and
identifying the Air Turbine Starter (ATS) as degraded if the rotational speed of the Air Turbine Starter (AT S) does not increase in response to the open command to the starter air valve and the pressure drop is less than said predetermined pressure drop.

13. The method as recited in claim 12, further comprising:
monitoring a rotational speed of a gas turbine engine selectively driven by the Air Turbine Starter (ATS); and
identifying a starter shaft of the Air Turbine Starter (ATS) as degraded if the rotational speed of the gas turbine engine does not increase in response to an open command to the starter air valve, if the rotational speed of the Air Turbine Starter (ATS) does not increase in response to the open command to the starter air valve and if the pressure drop is less than the predetermined pressure drop.

* * * * *